April 14, 1970     C. DE ANGELI     3,506,317
ANTIFRICTION BEARING
Filed Sept. 20, 1968
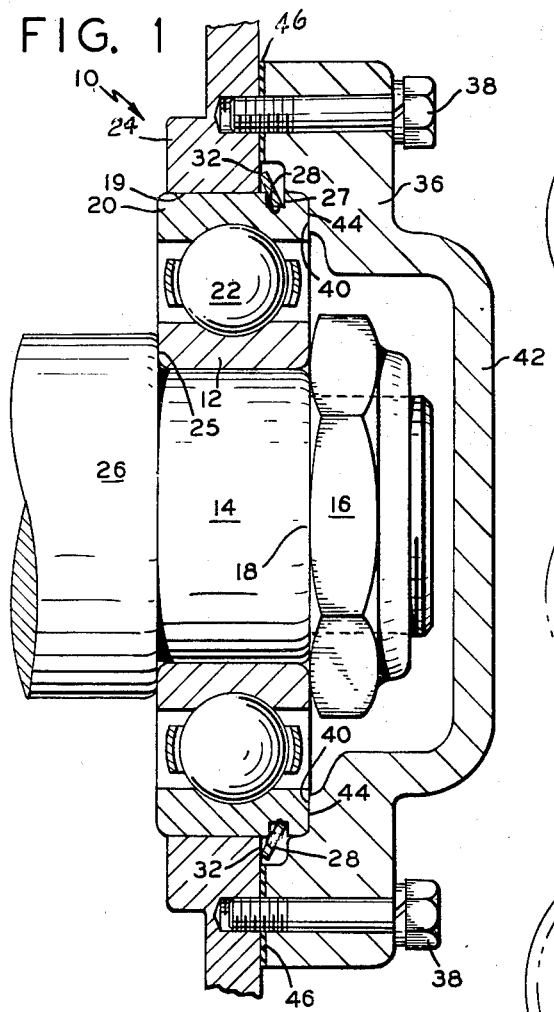
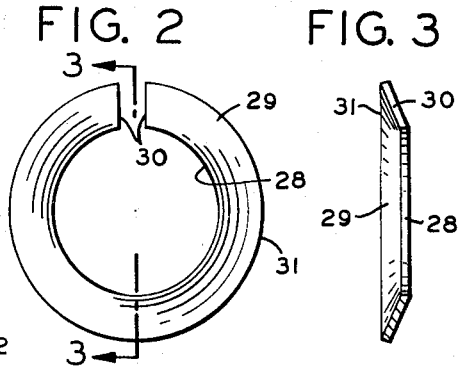
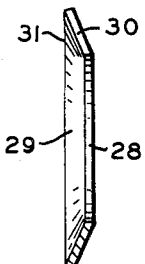
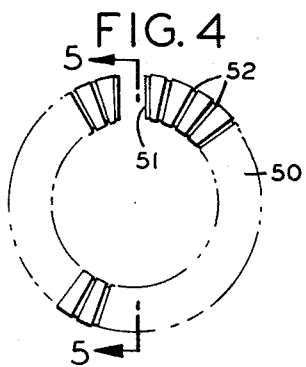
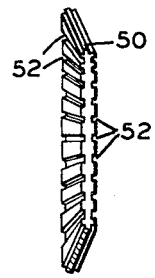
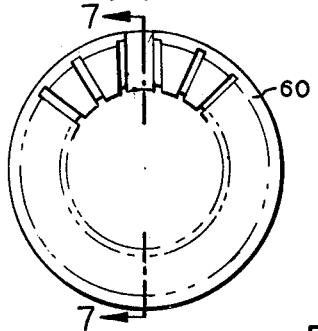
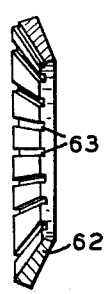
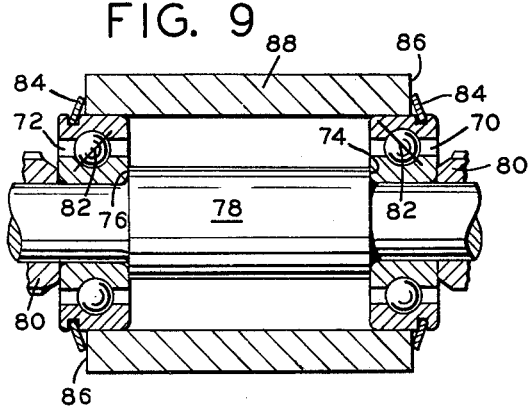
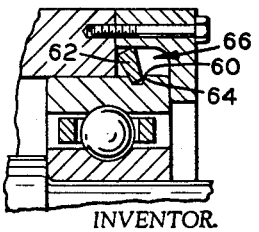
INVENTOR.
CHRISTOPHER deANGELI
BY JOHN P. CHANDLER
HIS ATTORNEY.

United States Patent Office 3,506,317
Patented Apr. 14, 1970

3,506,317
ANTIFRICTION BEARING
Christopher de Angeli, Ridgefield, Conn., assignor to Norma Fag Bearing Corporation, Joplin, Mo., a corporation of Delaware
Filed Sept. 20, 1968, Ser. No. 761,081
Int. Cl. F16c 35/06
U.S. Cl. 308—236                              7 Claims

ABSTRACT OF THE DISCLOSURE

This invention contemplates the use of a belleville spring washer which is either a continuous ring or which has a radial cut to enable its insertion into a groove in the outer periphery of the outer ring of an antifriction bearing. The bearing is assembled in the usual manner upon a shaft and slip-fitted into a housing. The housing is so proportioned relative to the outer ring as to permit the ring to project from the housing and in this manner the ring groove is spaced from the end of the housing. This will permit the conical spring washer to become biased against the end of the housing by securing a ring or end cap to the housing which presses against the outer ring of the bearing. The resistance caused thereby restrains outer ring rotation or creep which otherwise would result in wear.

---

This invention relates to antifriction bearings and more particularly to an antifriction bearing assembly which contemplates a structure so designed as to substantially eliminate creep or relative motion of the outer ring relative to its housing.

The usual prior art method of securing an antifriction bearing in a housing is to insert a conventional snap-ring in a groove in the outer periphery of the outer ring of the bearing and secure the ring to the housing, thus pressing the outer ring axially inwardly until the snap-ring presses against the end of the housing. The resulting resistance is not always successful in preventing ring rotation and creep and, when the various components are at a maximum manufacturing tolerance, the resistance to ring rotation in resulting assembly may be of very low order.

It is an object, therefore, of the present invention to provide an antifriction bearing assembly substantially free from outer ring rotation and creep in the housing, thus eliminating wear.

Another object is to permit proper assembly of parts having the greatest manufacturing tolerances but nevertheless giving the desired results.

Another object is to produce an assembly having axially preloaded bearings.

Other objects and advantages will become apparent by reference to the following specification taken in connection with the accompanying drawings wherein:

FIG. 1 is a sectional view of a typical antifriction bearing assembly;

FIG. 2 is a plan view of a truncated conical spring;

FIG. 3 is a sectional view taken along line 3—3 of FIG. 2;

FIG. 4 is a plan view of a modified truncated conical spring;

FIG. 5 is a sectional view taken along line 5—5 of FIG. 4;

FIG. 6 is a plan view of a further modified truncated conical spring;

FIG. 7 is a sectional view taken along line 7—7 of FIG. 6;

FIG. 8 is a sectional view of a fragmentary portion of a bearing assembly including the modification of FIGS. 6 and 7;

FIG. 9 is a sectional view of an antifriction assembly illustrating axially pre-loaded condition.

The bearing assembly indicated at 10 in FIG. 1 comprises a ball bearing with an inner ring 12 mounted in fixed relation on a reduced shaft section 14 by a nut 16 screwed onto a threaded end 18 of the shaft 14. A complement of rolling elements 22 is positioned between an outer ring 20 and the inner ring. The outer ring is slip-fitted into a circular opening 19 in a frame or housing 24.

Inward movement of the inner ring is limited by a shoulder 25 on an enlarged shaft section 26. A groove 27 similar to a snap ring groove in the outer diameter of the outer ring receives the inner periphery 28 of a truncated conical spring 29 which is split or radially cut at 30. This spring, commonly known as a belleville washer, is designed to carry heavy loads in a limited space, since residual stresses are introduced into the spring during manufacture. The outer periphery or margin 31 engages a flat annular surface 32 of the housing adjacent the circular opening 19.

In operation, after assembling the inner ring 12 upon the reduced shaft terminal 14 and by virtue of a radial split 30 the conical spring 28 is assembled into the groove 27, and the outer ring 20 is slip-fitted into the housing 24. The end cap 36 is secured to the housing 24 by the screws 38 against a gasket 46. As the screws 38 are tightened, the surface 40 of the end cap presses against the face 44 of the outer ring thereby compressing the spring 29 between the groove 27 and the housing surface 32. The resulting frictional and deformation forces resist the usual rotation and creep of the outer ring. It will be apparent from the foregoing that flat surface 40 of the end cap forms a fixed stop against outward movement of the outer ring. Movement of the ring inwardly is restrained by the resilient Belleville washer.

The truncated conical spring can be used in a modified form which is illustrated in FIGS. 4 and 5. The spring 50 is provided with serrations 52 on both sides which enhance the deformation forces and further insuring against creep and rotation of the outer ring. The spring 50 is provided with a radial split 51 to facilitate assembly.

A further modification is illustrated in FIGS. 6 and 7 wherein the spring 60 is a continuous ring and is not split. The primary reason for the radial cut is to faciliate assembly but if the parts are properly proportioned the belleville spring washer can be forced over the outer end of the outer ring and into the groove. These figures also show a spring 60 having a generally truncated conical shape constructed with a cross-section having a tapered shape 62 in addition to serrations 63 on its inner surface. This tapered cross-section 62 cooperates with a turncated conical groove 64 (FIG. 8) in the outer ring of a bearing in cooperation with constraining surface 66 to increase restraining action of the outer ring.

In addition to restraining creep and rotation of the outer ring, it will become apparent that these conical springs can be used for axially preloading bearings as illustrated in FIG. 9 wherein a pair of bearings 70 and 72 are secured against shoulders 74 and 76 on a shaft 78 by lock nuts 80. This axial pressure against the inner rings of the bearings is transmitted diagonally in the direction of lines 82 across the balls of the bearings 70 and 72 through the outer rings to cause the conical springs 84 to resiliently press against opposed ends 86 of a housing 88 thus keeping the bearings 70 and 72 constantly axially preloaded.

While there have been described herein what are at present considered preferred embodiments of the invention, it will be obvious to those skilled in the art that many modifications and changes may be made therein without departing from the essence of the invention.

I claim:

1. An improvement for restraining outer ring rotation and creep in an antifriction bearing assembly having a shaft mounted for rotation within a frame and including an inner ring fast on the shaft, an outer ring mounted in the frame, and a complement of rolling elements between the rings, said improvement including a fixed member on the frame engaging the outer face of the outer ring, and resilient means urging said outer ring axially toward said fixed member, said outer ring having an annular groove on its outer periphery, the frame being formed with an annular face located radially outwardly of said groove and said resilient means comprising a belleville spring washer positioned within the groove and with its outer periphery lying radially outwardly of the groove and resiliently engaging said annular face of the frame.

2. The structure of claim 1 wherein the spring washer is radially cut.

3. In claim 1, the feature that the truncated belleville spring washer is provided with radial serrations on at least one of its surfaces to increase resistance against rotation of the outer ring.

4. In claim 1, the feature that the truncated belleville spring washer is provided with radial serrations on its inner and outer surfaces to increase resistance against rotation of the outer ing.

5. In claim 1, the feature that the belleville spring washer is of gradually increasing thickness in cross-section from the inside to the outside diameter to increase resistance to rotation of the outer ring.

6. In claim 1, the feature that the belleville washer is provided with a tapered cross-section and radial serrations on its inner surface to increase the resistance to rotation of the outer ring.

7. The improvement recited in claim 1 wherein the bearing assembly including the belleville spring is positioned at both ends of the shaft to retain both bearings constantly preloaded axially.

References Cited

FOREIGN PATENTS 1,082,612　9/1967　Great Britain.

MARTIN P. SCHWADRON, Primary Examiner

F. SUSKO, Assistant Examiner